United States Patent
Yokoi et al.

(10) Patent No.: US 12,454,243 B2
(45) Date of Patent: Oct. 28, 2025

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Tomoya Yokoi, Aichi (JP); Junichi Muranaka, Aichi (JP); Yoshiteru Sakaguchi, Aichi (JP); Hayato Uchibori, Aichi (JP); Yuta Suzuki, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 306 days.

(21) Appl. No.: 18/147,390

(22) Filed: Dec. 28, 2022

(65) Prior Publication Data

US 2023/0219520 A1    Jul. 13, 2023

(30) Foreign Application Priority Data

Jan. 12, 2022 (JP) ................... 2022-003379

(51) Int. Cl.
*B60R 22/46* (2006.01)
*B60R 22/28* (2006.01)
*B60R 22/34* (2006.01)

(52) U.S. Cl.
CPC .... *B60R 22/4676* (2013.01); *B60R 2022/287* (2013.01); *B60R 22/341* (2013.01)

(58) Field of Classification Search
CPC .............. B60R 22/341; B60R 22/4676; B60R 2022/286; B60R 2022/287
See application file for complete search history.

(56) References Cited

U.S. PATENT DOCUMENTS

| | | | |
|---|---|---|---|
| 8,540,179 B2 | 9/2013 | Mizuno | |
| 10,518,744 B2* | 12/2019 | Miida | B60R 22/4676 |
| 2005/0087641 A1* | 4/2005 | Bell | B60R 22/3413 |
| | | | 242/379.1 |
| 2006/0076448 A1* | 4/2006 | Bell | B60R 22/3413 |
| | | | 242/382 |
| 2008/0029633 A1 | 2/2008 | Hiramatsu | |
| 2011/0174910 A1* | 7/2011 | Ukita | B60R 22/3413 |
| | | | 242/379.1 |
| 2011/0248489 A1* | 10/2011 | Moro | B60R 22/3413 |
| | | | 280/805 |

FOREIGN PATENT DOCUMENTS

JP    2007-331563 A    12/2007

* cited by examiner

*Primary Examiner* — Anna M Momper
*Assistant Examiner* — Ermia E. Melika
(74) *Attorney, Agent, or Firm* — Studebaker Brackett PLLC

(57) ABSTRACT

A webbing take-up device includes: a spool that enables pull-out and take-up of a webbing; a rotor disposed opposite from the spool, rotation of the rotor being impeded at a time of emergency; a wire of which a proximal end portion is retained at the rotor, at least a distal end portion of the wire being retained at the spool, the wire being disposed between the rotor and the spool, wherein the webbing is pulled out at a time of emergency of a vehicle, the wire being deformed and being wound onto a winding portion of the spool; and a retreat portion provided at the winding portion, the distal end portion of the wire being disposed at the retreat portion in a case in which the wire is wound onto the winding portion.

16 Claims, 9 Drawing Sheets

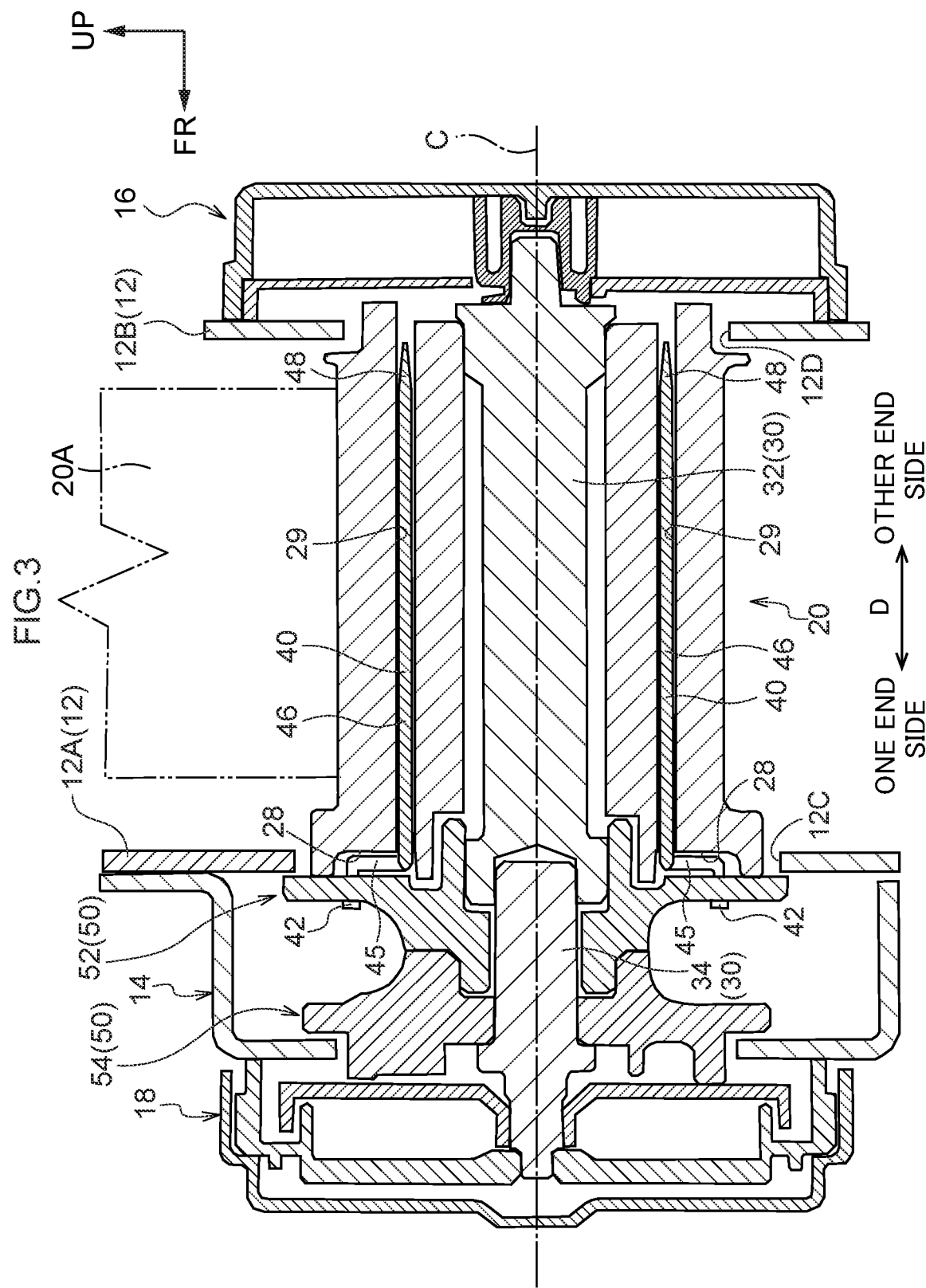

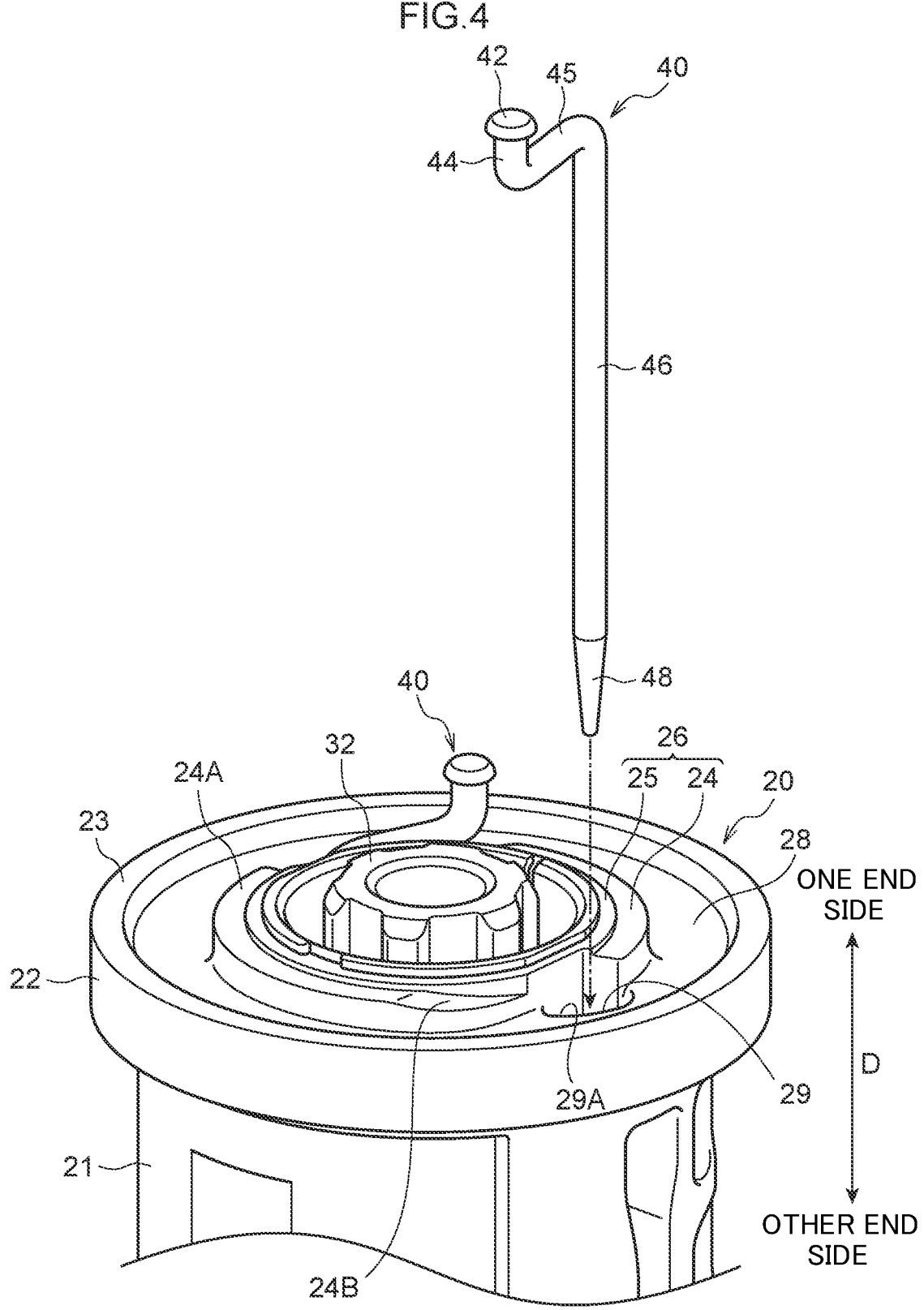

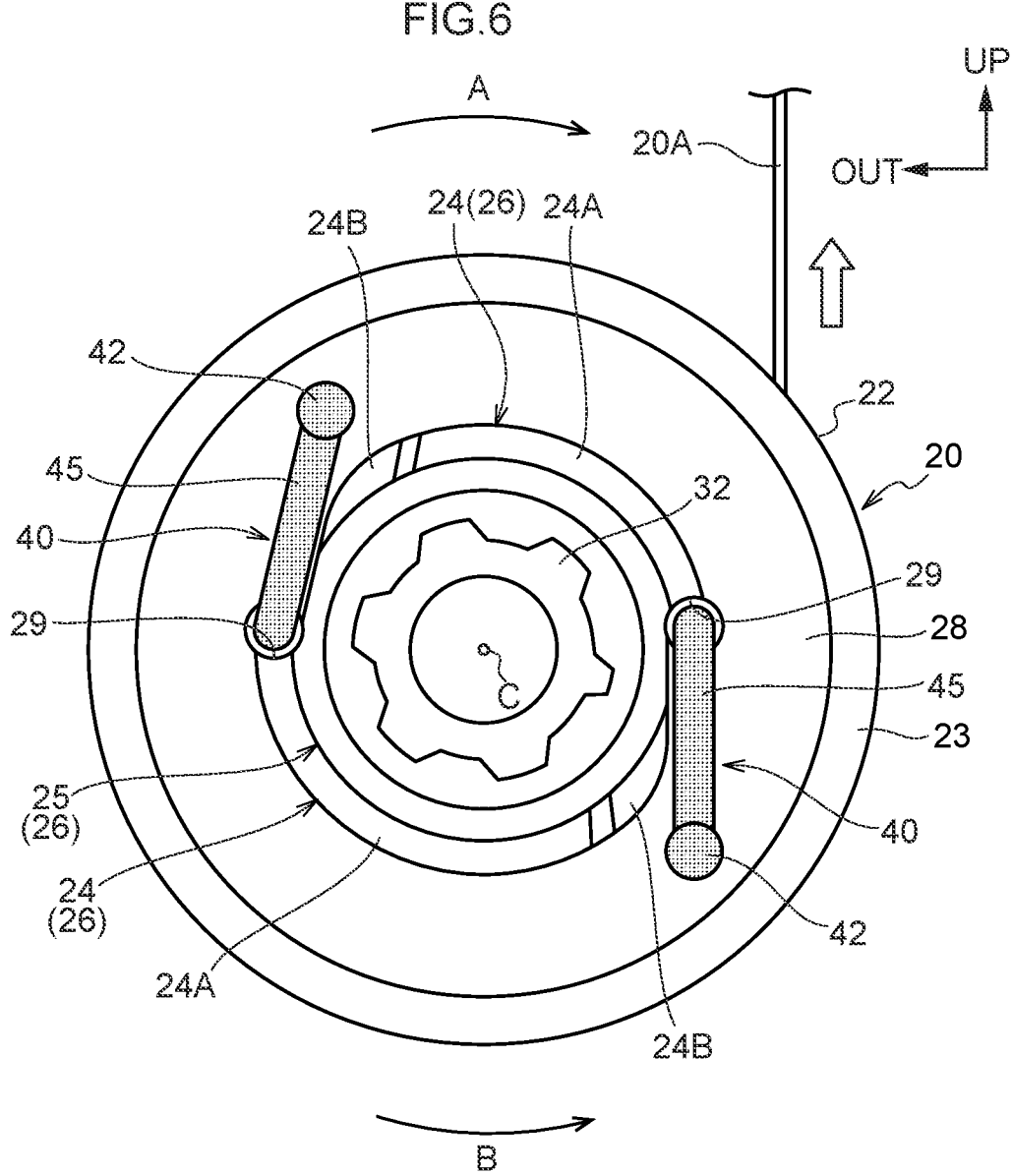

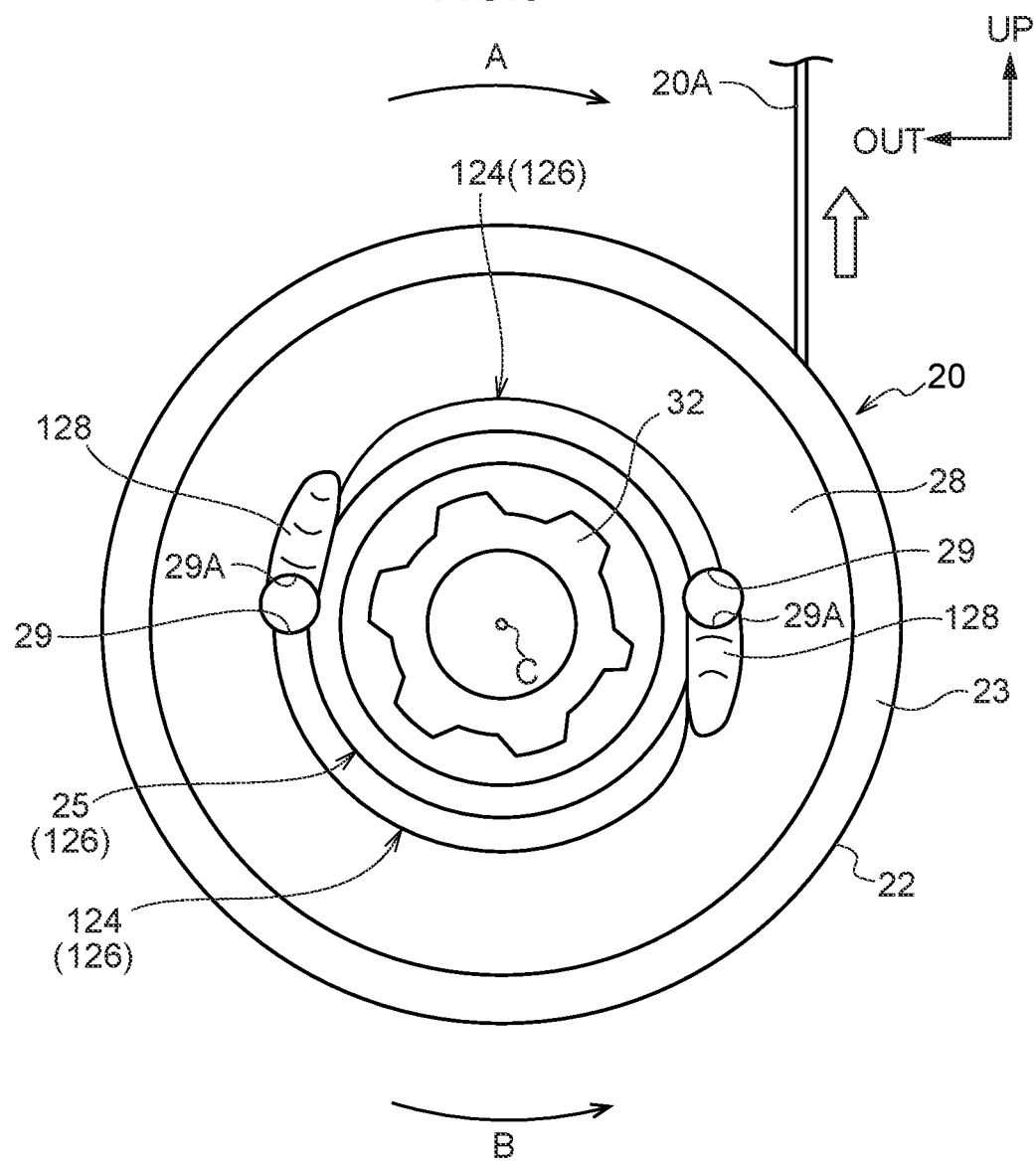

WEBBING TAKE-UP DEVICE

CROSS-REFERENCE TO RELATED APPLICATION

This application claims priority under 35 USC 119 from Japanese Patent Application No. 2022-3379 filed Jan. 12, 2022, the disclosure of which is incorporated by reference herein in its entirety.

BACKGROUND

Technical Field

The present disclosure relates to a webbing take-up device.

Related Art

As illustrated in Japanese Patent Application Laid-Open (JP-A) No. 2007-331563, a webbing take-up device is known that, in order to prevent a load applied to a webbing from increasing and a person's torso from being compressed, is provided with a force limiter mechanism that moderates the increase when a load above a certain load acts on the webbing.

JP-A No. 2007-331563 discloses a technology in which an energy absorption pin is fitted into an axial direction hole in a spool. At a time of emergency, in addition to a torsion bar being twisted, the energy absorption pin is pulled out from the spool and absorbs energy.

SUMMARY

In this kind of webbing take-up device, it is preferable to suppress temporary increases in force limiter load.

In consideration of the circumstances described above, the present disclosure provides a webbing take-up device that may suppress a temporary increase in force limiter load.

A webbing take-up device according to a first aspect of the present disclosure includes: a spool that enables pull-out and take-up of a webbing; a rotor disposed opposite from the spool, rotation of the rotor being impeded at a time of emergency; a wire of which a proximal end portion is retained, the wire being disposed between the rotor and the spool, wherein, at a time of emergency, the wire is deformed and the webbing is pulled out, the wire being wound onto a winding portion of the spool; and a retreat portion toward which a distal end portion of the wire retreats in a case in which the wire is wound onto the winding portion.

In a webbing take-up device according to a second aspect of the present disclosure, in the webbing take-up device according to the first aspect of the present disclosure, the retreat portion is formed in a sloped shape at the winding portion.

In a webbing take-up device according to a third aspect of the present disclosure, in the webbing take-up device according to the first aspect or second aspect of the present disclosure, the retreat portion is formed in a recessed shape at a periphery of the winding portion.

In a webbing take-up device according to a fourth aspect of the present disclosure, in the webbing take-up device according to any one of the first to third aspects of the present disclosure, the winding portion is recessed toward an inner side in a winding direction at the winding portion at which the retreat portion is provided.

In a webbing take-up device according to a fifth aspect of the present disclosure, in the webbing take-up device according to any one of the first to fourth aspects of the present disclosure, the retreat portion is formed at a periphery of an accommodation hole of the spool, the distal end portion of the wire being accommodated by the accommodation hole.

In a webbing take-up device according to a sixth aspect of the present disclosure, in the webbing take-up device according to any one of the first to fifth aspects of the present disclosure, a plural number of wire are provided.

In the webbing take-up device according to the first aspect of the present disclosure, because the retreat portion toward which the distal end portion of the wire retreats in a case in which the wire is being wound on the winding portion is provided, abrasion of the winding portion by the distal end portion of the wire is suppressed. Therefore, a temporary rise in a load from the wire that acts on the spool during the winding of the wire is suppressed. As a result, a temporary rise in force limiter load may be suppressed.

In the webbing take-up device according to the second aspect of the present disclosure, because the retreat portion is formed in the sloped shape at the winding portion, in a case in which the wire is wound on the winding portion, the distal end portion of the wire is guided (directed) by the retreat portion formed in the sloped shape. Consequently, strong pressing by the distal end portion of the wire against the winding portion is suppressed. As a result, abrasion of the winding portion by the distal end portion of the wire is suppressed. The temporary rise in force limiter load may be suppressed by a simple structure.

In the webbing take-up device according to the third aspect of the present disclosure, because the retreat portion is formed in the recessed shape at the periphery of the winding portion, in a case in which the wire is wound on the winding portion, the distal end portion of the wire retreats into the retreat portion formed in the recessed shape.

Consequently, strong pressing by the distal end portion of the wire against the winding portion is suppressed. As a result, abrasion of the winding portion by the distal end portion of the wire is suppressed. Therefore, the temporary rise in force limiter load may be suppressed by a simple structure.

In the webbing take-up device according to the fourth aspect of the present disclosure, because the winding portion is recessed toward the inner side in the winding direction at the winding portion at which the retreat portion is provided, a space into which the distal end portion of the wire retreats is formed at the inner side in the winding direction. Consequently, abrasion of the winding portion by the distal end portion of the wire is further suppressed. A temporary rise in a load from the wire that acts on the spool during the winding of the wire is further suppressed. The temporary rise in force limiter load may be further suppressed.

In the webbing take-up device according to the fifth aspect of the present disclosure, because the retreat portion is formed at the periphery of the accommodation hole of the spool, in a case in which the distal end portion of the wire is pulled out from the accommodation hole, the distal end portion of the wire retreats toward the retreat portion. When the distal end portion of the wire is pulled out from the accommodation hole of the spool, abrasion of the winding portion by the distal end portion of the wire is suppressed. The temporary rise in force limiter load may be suppressed.

In the webbing take-up device according to the sixth aspect of the present disclosure, because the plural wires are provided, movement of the distal end portion of a wire toward the radial direction outer side of the spool may be impeded by another of the wires. Even in this case, abrasion of the winding portion by the distal end portion of a wire may be suppressed by the retreat portion.

BRIEF DESCRIPTION OF THE DRAWINGS

FIG. 3 is a sectional diagram showing the webbing take-up device according to the first exemplary embodiment, showing section A-A in FIG. 2;

FIG. 4 is an exploded perspective view showing a state before a wire is inserted into an accommodation hole formed in the spool according to the first exemplary embodiment;

FIG. 6 is a side view in which the spool according to the first exemplary embodiment is seen from the one end side;

FIG. 8 is a side view in which a spool according to a second exemplary embodiment is seen from one end side;

DETAILED DESCRIPTION

First Exemplary Embodiment

Figure 1:
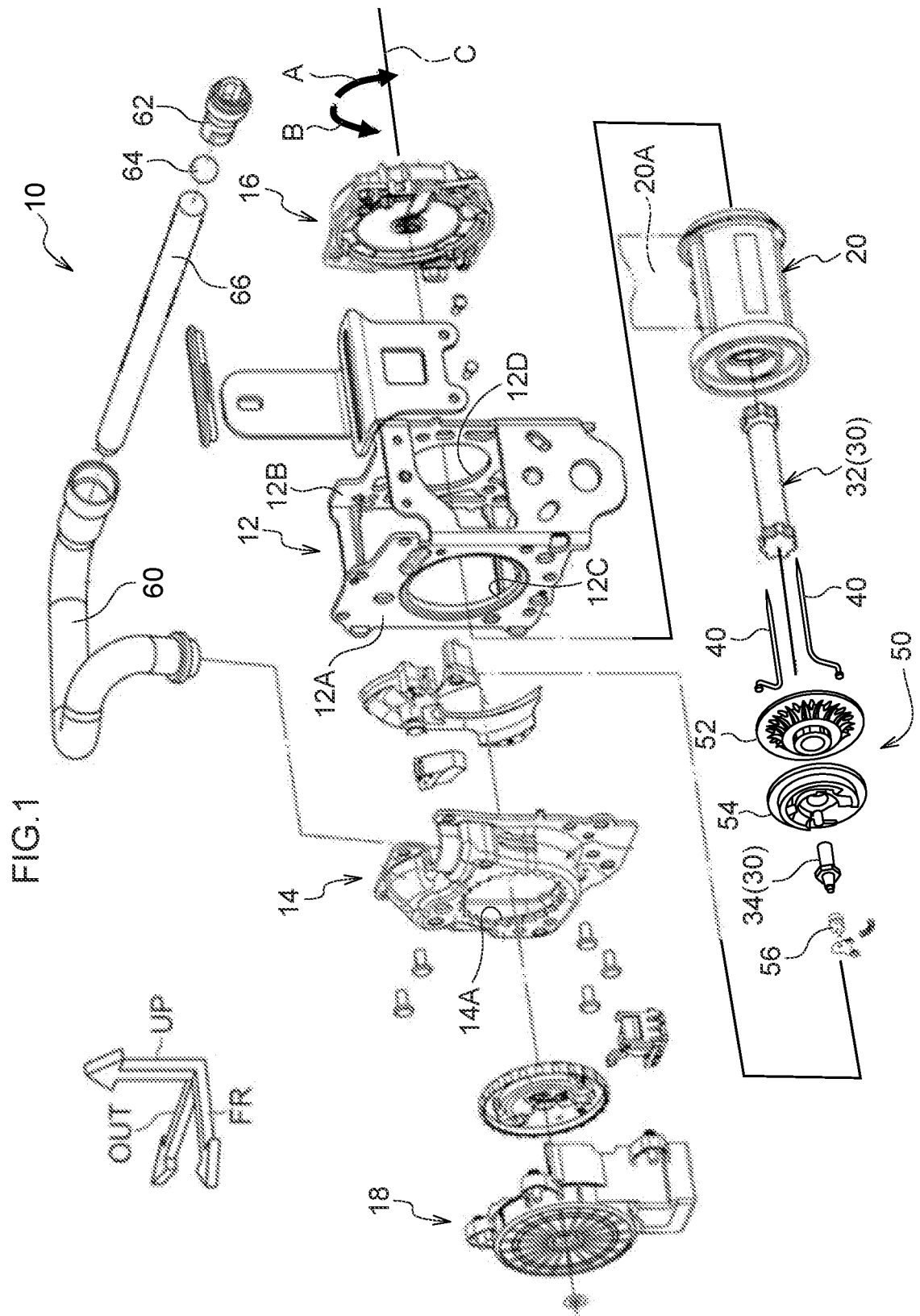
FIG. 1 is an exploded perspective view showing a webbing take-up device according to a first exemplary embodiment.

A webbing take-up device according to the first exemplary embodiment is described with reference to the drawings. In the drawings, the arrow FR indicates forward in a vehicle front-rear direction, the arrow OUT indicates outward in a vehicle width direction, and an arrow UP indicates upward in a vehicle vertical direction. The arrow A in the drawings indicates a take-up direction A, which is a rotation direction of a spool 20 when the spool 20 is taking up a webbing 20A. The arrow B indicates a pull-out direction B, which is opposite to the take-up direction A. An axial direction D in the drawings is an axial direction of the spool 20. Where descriptions are given simply using "one end side" and "other end side", unless particularly specified, these are sides in the axial direction D of the spool 20.

—Structure of the Webbing Take-up Device—

As shown in FIG. 1, a webbing take-up device 10 principally includes a frame 12, a cover plate 14, an urging mechanism 16, a sensor mechanism 18, the spool 20, a shaft 30, a rotor 50 and a cylinder 60.

The Frame 12

The frame 12 is fabricated of metal and is fixed to the vehicle lower side of a center pillar (not shown in the drawings) that serves as the vehicle body. The frame 12 is formed in a square tube shape as seen in the vehicle vertical direction, including a leg portion 12A formed at the vehicle front side of the frame 12 and a leg portion 12B formed at the vehicle rear side. A circular penetrating hole 12C penetrating in the vehicle front-rear direction is formed in the leg portion 12A, and a circular penetrating hole 12D penetrating in the vehicle front-rear direction is formed in the leg portion 12B. The spool 20 is inserted into the penetrating hole 12C of the leg portion 12A and the penetrating hole 12D of the leg portion 12B, and is rotatably supported by the leg portion 12A and the leg portion 12B.

The Spool 20

The spool 20 is formed substantially in a circular tube shape, and is rotatable in a take-up direction A and a pull-out direction B with a central axis C as the rotation axis. A length direction proximal end portion of the long, narrow, belt-shaped webbing 20A is anchored at the spool 20. When the spool 20 is rotated in the take-up direction A, the webbing 20A is taken up onto the spool 20. When the webbing 20A is pulled out from the spool 20, the spool 20 is rotated in the pull-out direction. The webbing 20A is pulled out from the spool 20 and is wrapped round a vehicle occupant sitting on a seat of the vehicle.

The Urging Mechanism 16

The urging mechanism 16 is provided at the vehicle rear side of the frame 12. The urging mechanism 16 is provided with a spool urging member (not shown in the drawings) such as a spiral spring or the like. The spool urging member is directly or indirectly engaged with the spool 20. The spool 20 is urged in the take-up direction A by urging force of the spool urging member.

The Shaft 30

As shown in FIG. 3, the shaft 30 is structured with a torsion shaft 32, which serves as a first energy absorbing member, and a sub shaft 34.

The torsion shaft 32 is fabricated of metal and formed substantially in a circular rod shape. The torsion shaft 32 is disposed inside the spool 20, coaxially with the central axis C of the spool 20. A vehicle rear side (another end side) of the torsion shaft 32 is coupled to the spool 20 to be rotatable integrally with the spool 20. The other end side of the torsion shaft 32 is rotatably supported at the urging mechanism 16.

A vehicle front side (one end side) of the torsion shaft 32 is coaxially coupled to the sub shaft 34. The sub shaft 34 is fabricated of metal and formed substantially in a circular rod shape. One end side of the sub shaft 34 is rotatably supported at the sensor mechanism 18. The torsion shaft 32 constitutes a first force limiter mechanism which serves as the force limiter mechanism.

The Rotor 50

As shown in FIG. 1 and FIG. 3, the rotor 50, which constitutes a lock mechanism, is provided opposite from the spool 20 in the axial direction D. The rotor 50 is structured with a pinion 52 and a lock base 54. The lock base 54 is provided at the vehicle front side relative to the pinion 52. The lock base 54 is, for example, formed in a circular plate shape by aluminium die-casting. The lock base 54 is disposed coaxially with the central axis C of the spool 20.

Figure 2:
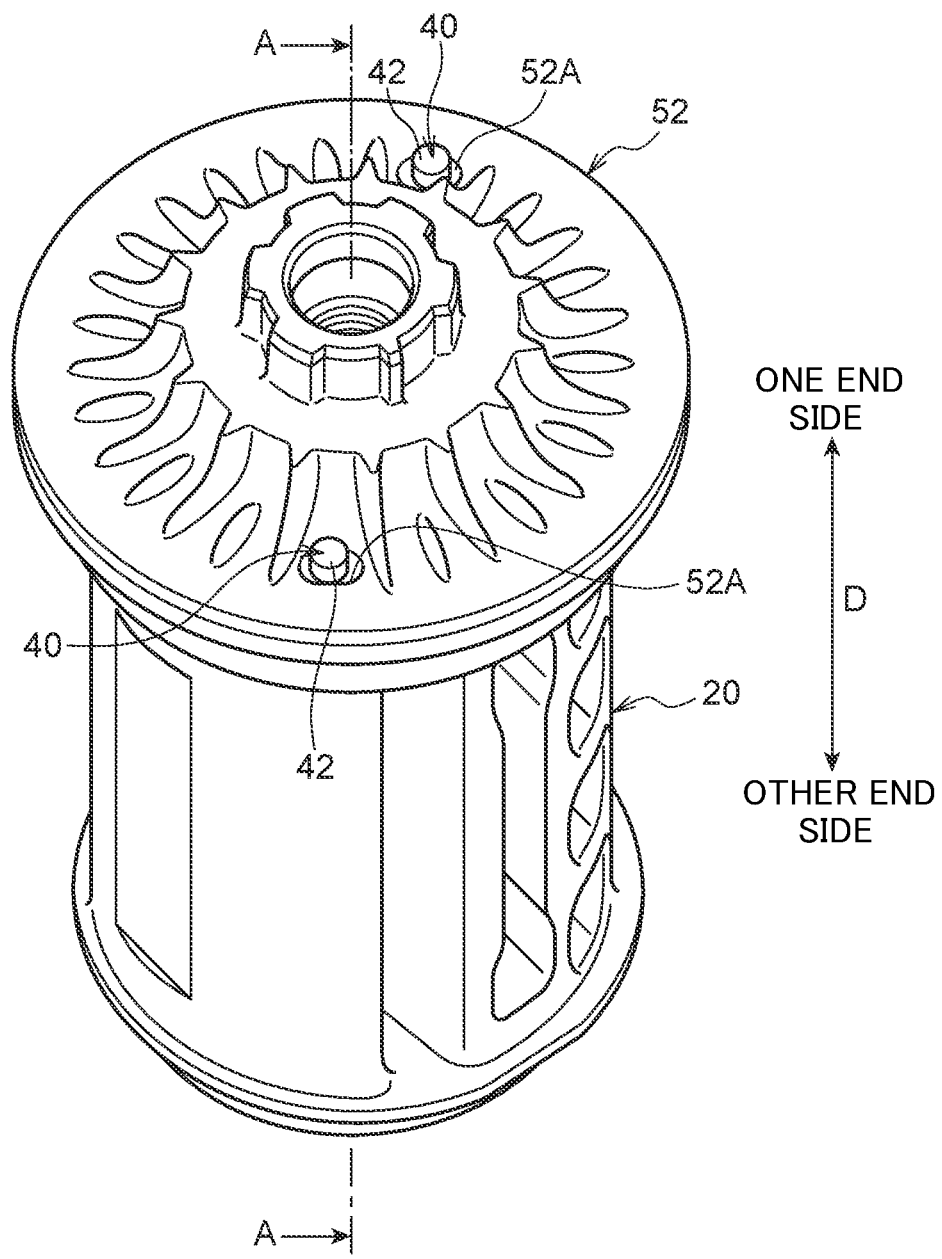
FIG. 2 is a perspective view showing a spool and pinion according to the first exemplary embodiment.

As shown in FIG. 2 and FIG. 3, the pinion 52 is, for example, formed in a circular plate shape by aluminium die-casting. The pinion 52 is disposed coaxially with the central axis C of the spool 20. The pinion 52 is coupled to the lock base 54 to be integrally rotatable with the lock base 54.

The one end side of the torsion shaft 32 is fitted into the pinion 52. Relative rotation between the pinion 52 and the one end side of the torsion shaft 32 is limited. Thus, the spool 20, the torsion shaft 32, the lock base 54 and the pinion 52 are rotatably integrated.

As shown in FIG. 1, the lock base 54 is provided with a lock pawl 56. The lock pawl 56 is turnably supported at the lock base 54.

As shown in FIG. 2, two penetrating holes 52A penetrating in the axial direction D are formed in the pinion 52. The penetrating holes 52A may be formed as long holes.

The Cover Plate 14

As shown in FIG. 1 and FIG. 3, the cover plate 14 is fixed to the leg portion 12A of the frame 12. The cover plate 14 is fabricated of metal and covers the pinion 52 and the lock base 54. Ratchet teeth 14A are formed at a ratchet hole that penetrates through the cover plate 14 in the vehicle front-rear direction.

The Sensor Mechanism 18

The sensor mechanism 18 is provided at the vehicle front side of the cover plate 14. At a time of emergency, the sensor mechanism 18 is activated, the lock pawl 56 turns and moves to a radial direction outer side relative to the lock base 54, and a distal end portion of the lock pawl 56 meshes with the ratchet teeth 14A. As a result, rotation of the lock base 54 in the pull-out direction B is limited, indirectly limiting rotation of the spool 20 in the pull-out direction B. The meaning of the term "time of emergency" as used herein is intended to include times of rapid deceleration of the vehicle, times when the webbing 20A is suddenly pulled out from the spool 20 and the like, which are times of collision of the vehicle and the like.

The Cylinder 60

As shown in FIG. 1, the webbing take-up device 10 is provided with the cylinder 60, which constitutes a pretensioner. A micro gas generator 62 (below referred to as "the MGG 62") is inserted into a proximal end side of the cylinder 60. The MGG 62 is electrically connected, via an electronic control unit (not shown in the drawings), to a collision detection sensor (not shown in the drawings) provided at the vehicle. A seal ball 64 and a moving member 66 that serve as a piston are disposed inside the cylinder 60.

When an impact at a time of vehicle collision is detected by the collision detection sensor, the MGG 62 produces gas, the moving member 66 is pushed by the seal ball 64, and the moving member 66 moves toward the distal end side of the cylinder 60. In a state in which the moving member 66 is thrust between tooth portions of the pinion 52 and the lock base 54 (a bitten state or engaged state), when the moving member 66 is moved, the spool 20 rotates in the take-up direction A and the webbing 20A is taken up, securing the vehicle occupant at the seat of the vehicle.

—Structure of Second Force Limiter Mechanism—

As shown in FIG. 3, two wires 40 that serve as second energy absorbing members are provided at the spool 20. The wires 40 constitute a second force limiter mechanism, which also serves as the force limiter mechanism.

The Wires 40

The wires 40 are formed of a metal with higher strength than the spool 20 (for example, piano wire). The wires 40 are formed of a metal that is more resistant to abrasion than the spool 20. The two wires 40 may be formed with the same lengths and the same shapes.

As shown in FIG. 4, each wire 40 is formed substantially in a crank shape with a proximal end portion 42, a first intermediate portion 44, a second intermediate portion 45, a third intermediate portion 46 and a distal end portion 48.

The proximal end portion 42 is formed in a circular plate shape. An outer diameter of the proximal end portion 42 is at least larger than a minimum inner diameter of each penetrating hole 52A formed in the pinion 52.

The first intermediate portion 44 is formed in a circular rod shape extending toward the other end side (the vehicle rear side) from the proximal end portion 42. The second intermediate portion 45 is formed in a circular rod shape extending in a direction substantially orthogonal to the axial direction D from an end portion of the first intermediate portion 44. The third intermediate portion 46 is formed in a circular rod shape extending in the axial direction D from an end portion of the second intermediate portion 45. The first intermediate portion 44, the second intermediate portion 45 and the third intermediate portion 46 may be formed with substantially the same diameters.

The distal end portion 48 is formed in a truncated cone shape that decreases in diameter in the axial direction D from an end portion of the third intermediate portion 46. Thus, the distal end portion 48 is formed in a shape that tapers toward the distal end of the wire 40.

The Spool 20

As shown in FIG. 4, the spool 20 is provided with a spool main body portion 21 in a substantially circular tube shape and a flange portion 22 that is formed at the one end side in the axial direction D of the spool main body portion 21.

The flange portion 22 is formed in a circular plate shape with a larger outer profile than the spool main body portion 21. The flange portion 22 includes an outer rib 23, an inner rib 26 that structures a winding portion, and a trench portion 28.

The outer rib 23 is formed at an outer edge of the flange portion 22 so as to protrude to the front side in the axial direction D. The outer rib 23 is formed in an annular shape. The inner rib 26 is formed at an inner edge of the flange portion 22 so as to protrude to the front side in the axial direction D. The inner rib 26 is formed in an annular shape. The trench portion 28 is formed between the outer rib 23 and the inner rib 26 as an annular trench that is recessed to the rear side in the axial direction D. The trench portion 28 accommodates the second intermediate portion 45 of each wire 40.

As shown in FIG. 3 and FIG. 6, two accommodation holes 29 are formed in the trench portion 28. The third intermediate portion 46 and distal end portion 48 of each wire 40 are accommodated by the corresponding accommodation hole 29. In a section perpendicular to the central axis C of the spool 20, the two accommodation holes 29 are provided at substantially point symmetrical locations relative to the central axis C. That is, in the section perpendicular to the central axis C of the spool 20, the two wires 40 are provided at substantially point symmetrical locations relative to the central axis C.

As shown in FIG. 3, each accommodation hole 29 may be formed as a circular penetrating hole that penetrates through the spool 20 in the axial direction D. The inner diameter of the accommodation hole 29 is slightly larger than the outer diameter of the third intermediate portion 46 of the wire.

As shown in FIG. 6, each accommodation hole 29 is formed at a radial direction inner side region of the trench portion 28. At least a portion of the accommodation hole 29 is formed in a region in the radial direction of the spool 20 in which the inner rib 26 is formed. The accommodation holes may be formed as blind holes (non-penetrating holes).

As shown in FIG. 4 and FIG. 6, the inner rib 26 is structured with an inner side portion 25 and outer side portions 24.

The inner side portion 25 is formed in a substantially annular shape. The inner side portion 25 is formed with a substantially constant thickness in the radial direction.

Two of the outer side portions 24 are formed at the outer side of the inner side portion 25 so as to connect between the two accommodation holes 29. Each outer side portion 24 is provided with a main body portion 24A and a retreat portion 24B. Each of the two main body portions 24A is formed to extend from the corresponding accommodation hole 29 through a predetermined angle (for example, 120°) around the center of the spool in the pull-out direction B. Heights of the main body portions 24A in the axial direction D may be made substantially constant.

Each retreat portion 24B is formed to extend from a pull-out direction B end portion of the corresponding main body portion 24A through a predetermined angle (for example, 30°) around the center of the spool in the pull-out direction B. The retreat portion 24B is formed in a vicinity of the accommodation hole 29 of the spool 20 by which the distal end portion 48 of the corresponding wire 40 is accommodated. The width of the retreat portion 24B in the radial direction progressively decreases closer to the accommodation hole 29. In other words, the inner rib 26 structuring the winding portion is formed to be recessed to an inner side at the portions of the inner rib 26 at which the retreat portion 24B is formed along the winding direction (the circumferential direction of the inner rib 26).

Figure 5A:
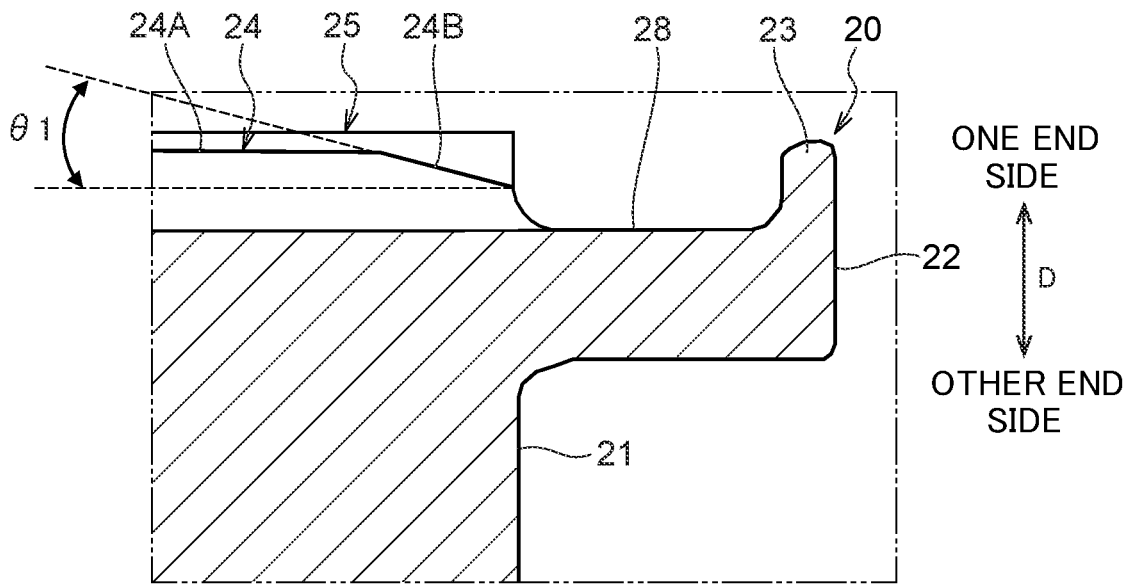
FIG. 5A is a sectional diagram showing one end side of the webbing take-up device according to the first exemplary embodiment, which shows the spool.

As shown in FIG. 5A, the retreat portion 24B is formed so as to be angled toward a floor face of the trench portion 28 from an end face of the main body portion 24A at the one end side thereof in the axial direction D. That is, an end face of the retreat portion 24B at the one end side in the axial direction D is formed in a sloped shape that is angled toward the floor face of the trench portion 28 from the end face of the main body portion 24A.

A length of the retreat portion 24B formed in the sloped shape may be made substantially the same as a length of the distal end portion 48 of the wire 40. However, note that the length of the retreat portion 24B formed in the sloped shape may be made longer than the length of the distal end portion 48 and may be made shorter.

Figure 5B:
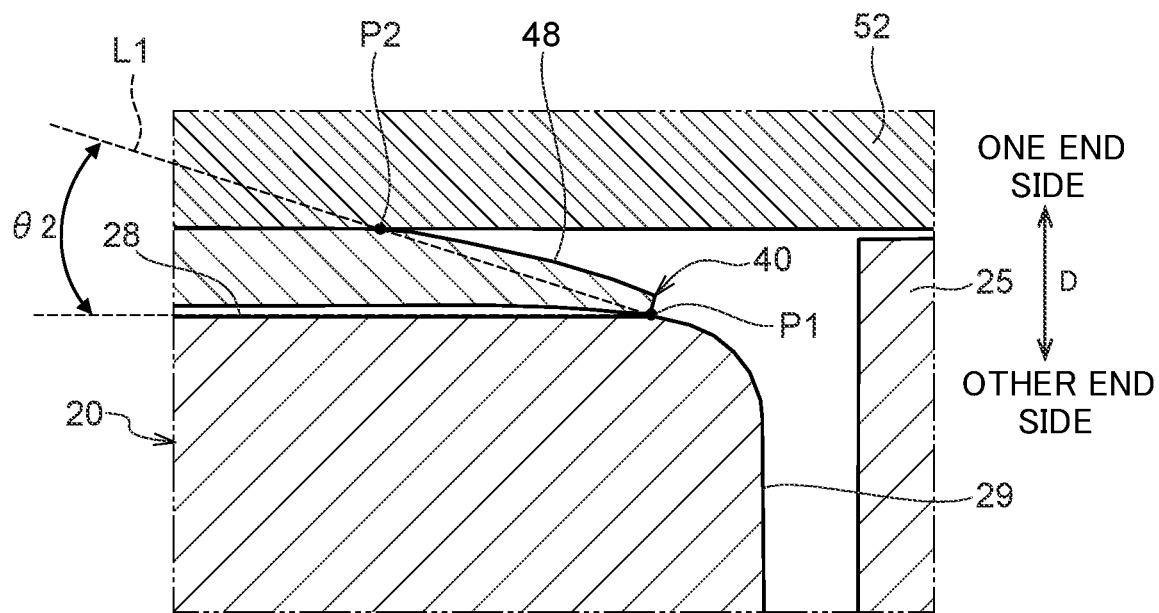
FIG. 5B is a sectional diagram showing the one end side of the webbing take-up device according to the first exemplary embodiment, which shows the spool, the wire and the pinion.

An end face of the main body portion 24A at the front side thereof in the axial direction D is formed at a predetermined angle $\theta 1$ (for example, 15°) relative to a perpendicular plane that is perpendicular to the axial direction D. When the distal end portion 48 of the wire 40 comes out from the accommodation hole 29 as is described below, as depicted in FIG. 5B, the distal end portion 48 of the wire 40 contacts the trench portion 28 in a vicinity of the accommodation hole 29 at a point P1 and a base of the distal end portion 48 of the wire 40 contacts the pinion 52 at a point P2. A line L1 linking point P1 with point P2 is formed at an angle $\theta 2$ (for example, 15°), which is the same as the angle $\theta 1$, relative to the perpendicular plane that is perpendicular to the axial direction D. However, note that angle $\theta 1$ and angle $\theta 2$ may be made to be different angles.

As shown in FIG. 2 and FIG. 3, each first intermediate portion 44, second intermediate portion 45, third intermediate portion 46 and distal end portion 48 is inserted into the corresponding penetrating hole 52A formed in the pinion 52 and the proximal end portion 42 is retained at the pinion 52. The third intermediate portion 46 and distal end portion 48 are inserted into the corresponding accommodation hole 29 of the spool 20, and the second intermediate portion 45 is accommodated in the trench portion 28. That is, the second intermediate portion 45 is disposed between the pinion 52 and the spool 20.

—Operation of the Force Limiter Mechanism—

The webbing 20A of the webbing take-up device 10 is pulled out from the spool 20 and the webbing 20A is wrapped round a vehicle occupant. The spool 20 is rotated in the take-up direction A by the urging force of the coil spring of the urging mechanism 16, and the webbing 20A is taken up onto the spool 20. Thus, slack is removed from the webbing 20A wrapped round the vehicle occupant.

At a time of collision of the vehicle, the sensor mechanism 18 is activated, the lock pawl 56 turns in the direction approaching the ratchet teeth 14A of the cover plate 14, and the lock pawl 56 meshes with the ratchet teeth 14A. Therefore, rotation of the lock base 54 in the pull-out direction B is limited, and rotation of the spool 20 in the pull-out direction B is limited.

Thus, because the rotation of the spool 20 in the pull-out direction B is limited, pulling out of the webbing 20A that is wound around the spool 20 is limited. Therefore, the body of the vehicle occupant, which acts to move to the vehicle forward side due to inertia at a time of rapid deceleration of the vehicle, is restrained by the webbing 20A.

In this state, the body of the vehicle occupant acting to move to the vehicle forward side due to inertia pulls on the webbing 20A. If a rotary force in the pull-out direction B that is applied to the spool 20 exceeds a mechanical strength of the torsion shaft 32 and the wires 40, the torsion shaft 32 plastically deforms so as to twist, and the spool 20 starts to rotate in the pull-out direction B relative to the lock base 54 whose rotation is limited.

Figure 7A:
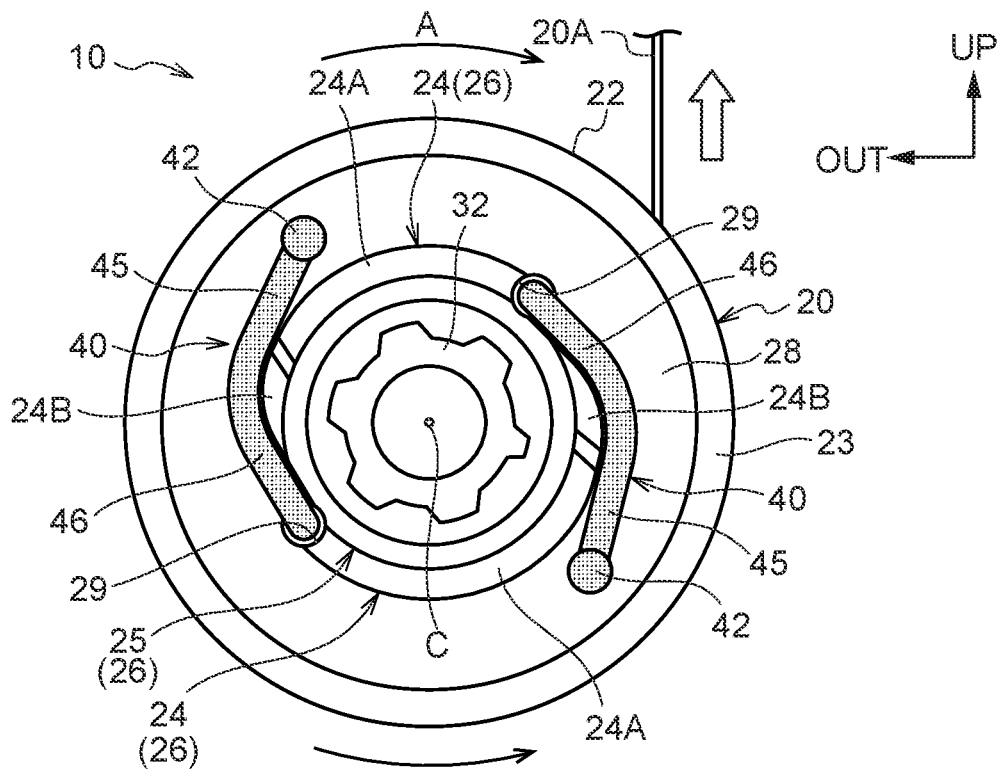
FIG. 7A is a side view in which the one end side of the spool according to the first exemplary embodiment is seen from the one end side, showing a state in which the webbing is pulled out and the spool is rotated in a pull-out direction.

When the spool 20 starts to rotate in the pull-out direction B relative to the lock base 54 in this manner, as illustrated in FIG. 7A, the third intermediate portions 46 of the wires 40 come out from the accommodation holes 29 in the state in which the proximal end portions 42 are retained at the pinion 52.

Accordingly, each third intermediate portion 46 coming out from the corresponding accommodation hole 29 is scraped against an opening edge 29A of the accommodation hole 29, is pressed against an outer periphery wall of the outer side portion 24, and is curved along this outer periphery wall. Thus, the second intermediate portion 45 and third intermediate portion 46 of the wire 40 are wound onto the outer side portion 24. That is, when, at the time of emergency, the wires 40 are deformed and the webbing 20A is pulled out, the wires 40 are wound onto the outer side portion 24 of the spool 20.

In this exemplary embodiment, when a pull-out load on the spool 20 from the webbing 20A due to the vehicle occupant (a rotation load in the pull-out direction B of the spool 20) exceeds the sum of a torsion resistance load of the torsion shaft 32 (a first force limiter load) and deformation resistance loads of the pair of wires 40 (a second force limiter load), the torsion shaft 32 torsionally deforms and the pair of wires 40 are deformed. Thus, rotation of the spool 20 in the pull-out direction B relative to the lock base 54 and the pinion 52 is tolerated. Therefore, kinetic energy of the vehicle occupant is absorbed by the torsional deformation of the torsion shaft 32 and the deformation of the pair of wires 40, and the vehicle occupant is protected.

Figure 7B:
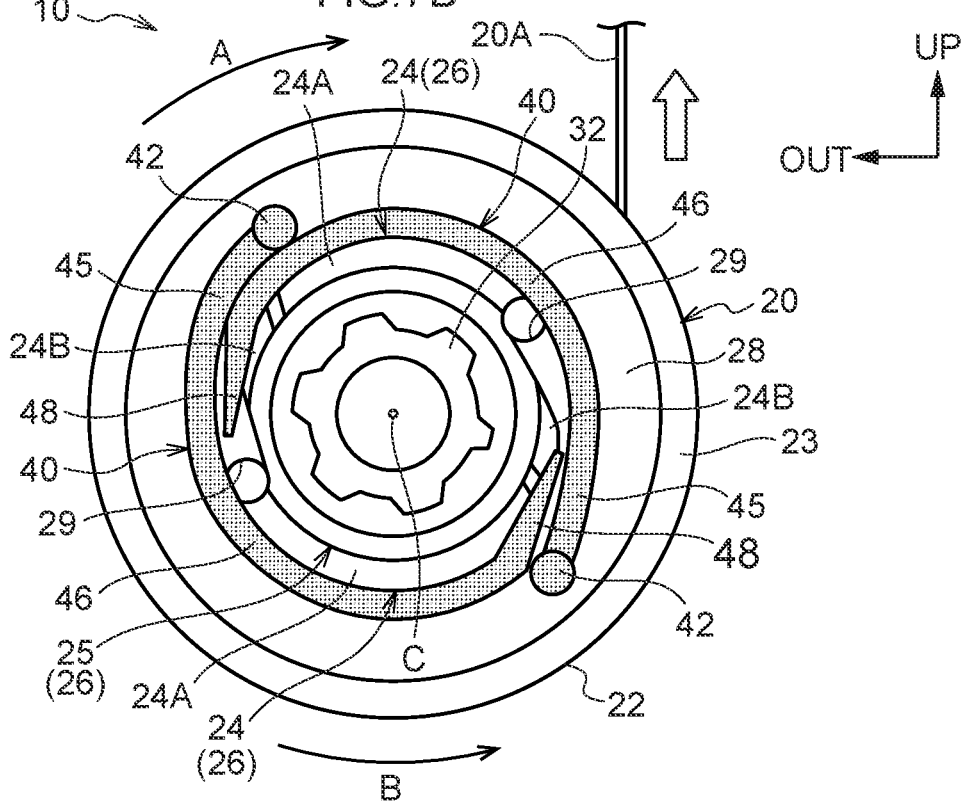
FIG. 7B is a side view in which the one end side of the spool according to the first exemplary embodiment is seen from the one end side, showing a state in which the webbing is pulled out further and the spool is rotated further in the pull-out direction.

When the spool 20 rotates further in the pull-out direction B relative to the lock base 54, as illustrated in FIG. 7B, in the state in which the proximal end portions 42 are retained at the pinion 52, the distal end portion 48 of each wire 40 comes out from the accommodation hole 29. When the distal end portion 48 of the wire 40 is coming out from the accommodation hole 29 and the second intermediate portion 45 and third intermediate portion 46 of the wire 40 are being wound onto the outer side portion 24 of the spool 20, the distal end portion 48 of the wire 40 is guided by the end face at the front side in the axial direction D of the retreat portion 24B, which is formed in the sloped shape.

During this operation, the wire 40 acts to turn about the proximal end portion 42 retained at the pinion 52. Hence, the second intermediate portion 45 or third intermediate portion 46 of the one wire 40 presses against the distal end portion 48 of the other wire 40 in the radial direction. At this time, because the inner rib 26 is formed to be recessed to the inner side at the retreat portion 24B of the inner rib 26, space is formed between the distal end portion 48 and the inner rib 26.

Then, the pull-out load on the spool 20 from the webbing 20A due to the vehicle occupant (the rotation load in the pull-out direction B of the spool 20) is equal or larger than the torsion resistance load of the torsion shaft 32 (the first force limiter load), the torsion shaft 32 further torsionally deforms.

Therefore, kinetic energy of the vehicle occupant is absorbed by the torsional deformation of the torsion shaft 32 and the vehicle occupant is protected.

That is, the kinetic energy of the vehicle occupant is absorbed in two stages, being absorbed by torsional deformation of the torsion shaft 32 and deformation of the pair of wires 40, and subsequently being absorbed by further torsional deformation of the torsion shaft 32. Thus, the vehicle occupant is protected.

Operation of the First Exemplary Embodiment

Now, operation of the first exemplary embodiment is described.

The webbing take-up device 10 according to the first exemplary embodiment is provided with the spool 20, which enables pull-out and take-up of the webbing 20A, and the rotor 50, which is disposed opposite from the spool 20 and impedes rotation at a time of emergency. The webbing take-up device 10 is provided with the retreat portions 24B. The proximal end portions 42 of the wires 40 are retained and disposed between the rotor 50 and the spool 20. At a time of emergency, while the wires 40 are deformed and the webbing 20A is pulled out, the wires 40 are wound onto the inner rib 26 of the spool 20. While the wires 40 are being wound onto the inner rib 26, the retreat portions 24B provides a space that allow the distal end portions 48 of the wires 40 to retreat.

If the retreat portions 24B were not provided at the inner rib 26, then when the distal end portion 48 of each wire 40 disengaged from the accommodation hole 29 accommodating the distal end portion 48 in the spool 20, retention of the distal end portion 48 of the wire 40 would be released and the distal end portion 48 of the wire 40 would be strongly pressed against the inner rib 26. Because the proximal end portion 42 of the wire 40 is retained at a position that is off-center relative to the spool 20, when the wire 40 was wound onto the inner rib 26, the wire 40 would act to turn to the inner side while turning about the proximal end portion 42 retained at the pinion 52, but the distal end portion 48 of the wire 40 could not get away from the inner rib 26. Because the distal end portion 48 of the wire 40 that had come out would bend to the inner side relative to the winding direction, the distal end portion 48 of the wire 40 would be strongly pressed against the inner rib 26. The wire 40 formed of piano wire is more resistant to abrasion than the spool 20 formed by aluminium die-casting. Therefore, when the distal end portion 48 of the wire 40 was strongly pressed against the inner rib 26, the inner rib 26 of the spool 20 would be abraded. As a result, the force limiter load according to the wires 40 would temporarily rise.

In the first exemplary embodiment, when each wire 40 is being wound onto the inner rib 26, because the retreat portion 24B at which the distal end portion 48 of the wire 40 retreats (separated from) the inner rib is provided, abrasion of the inner rib 26 by the distal end portion 48 of the wire 40 is suppressed. Therefore, a temporary rise in a load from the wire 40 that acts on the spool 20 during the winding of the wire 40 is suppressed. As a result, temporary rises in force limiter load due to the wires 40 may be suppressed.

In the webbing take-up device 10 according to the present exemplary embodiment, each retreat portion 24B is formed at the inner rib 26 in the sloped shape.

Because the retreat portion 24B is formed in the sloped shape at the inner rib 26, when the wire 40 is being wound onto the inner rib 26, the distal end portion 48 of the wire 40 is guided (directed) by the retreat portion 24B formed in the sloped shape. Consequently, strong pressing by the distal end portion 48 of the wire 40 against the inner rib 26 is suppressed. As a result, abrasion of the inner rib 26 by the distal end portion 48 of the wire 40 is suppressed. Therefore, temporary rises in force limiter load may be suppressed by a simple structure without an increase in size.

In the webbing take-up device 10 according to the first exemplary embodiment, the inner rib 26 is formed to be recessed to the radial direction inner side of the spool along the winding direction at the retreat portion 24B.

Because the inner rib 26 is formed to be recessed toward the radial direction inner side of the spool along the winding direction at the retreat portion 24B, a space toward which the distal end portion 48 of the wire 40 retreats is formed. Therefore, even when a force pressing the distal end portion 48 of the wire 40 to the radial direction inner side of the spool 20 acts from the other wire 40 at the outer side, a space toward which the distal end portion 48 of the wire 40 can retreat is formed along the winding direction at the inner side of the other wire 40. Consequently, abrasion of the inner rib 26 by the distal end portion 48 of the wire 40 is further suppressed, and a temporary rise in a load from the wire 40 that acts on the spool 20 during the winding of the wire 40 is further suppressed. As a result, temporary rises in force limiter load due to the wires 40 may be further suppressed.

In the webbing take-up device 10 according to the first exemplary embodiment, each retreat portion 24B is formed in a vicinity of the accommodation hole 29 of the spool 20 by which the distal end portion 48 of the wire 40 is accommodated.

Because the retreat portion 24B is formed in the vicinity of the accommodation hole 29 of the spool 20, when the distal end portion 48 of the wire 40 is being pulled out from the accommodation hole 29, the distal end portion 48 of the wire 40 retreats toward the retreat portion 24B. Therefore, when the distal end portion 48 of the wire 40 is being pulled out from the accommodation hole 29 in the spool 20, abrasion of the inner rib 26 by the distal end portion 48 of the wire 40 is suppressed. As a result, temporary rises in force limiter load due to the wires 40 may be suppressed.

In the webbing take-up device 10 according to the first exemplary embodiment, two of the wires 40 are provided.

Even when, because two of the wires 40 are provided, movement of the distal end portion 48 of one wire 40 to the radial direction outer side of the spool 20 is impeded by the other wire 40, abrasion of the inner rib 26 by the distal end portion 48 may be suppressed by the retreat portion 24B. Furthermore, because the force limiter load may be applied in accordance with the two wires 40, a force limiter structure that produces two levels of force limiter load with high loads may be formed.

Because the long wires 40 are used, a stroke length in which the force limiter load acts may be made long. Moreover, because the width of the main body portions 24A of the inner rib 26 is constant, and the width of each retreat portion 24B is recessed to the inner side in the winding direction, a change in shape of the main body portions 24A to an elliptical shape when the two wires 40 are wound on may be suppressed. That is, the circular shape may be preserved when the two wires 40 are wound on. Consequently, a temporary rise in force limiter load may be suppressed.

Second Exemplary Embodiment

A webbing take-up device according to the second exemplary embodiment differs from the webbing take-up device according to the first exemplary embodiment in that the structure of the retreat portions is different.

Structures of the webbing take-up device according to the second exemplary embodiment are described below. Descriptions of portions whose details are the same as or equivalent to the details described for the first exemplary embodiment are given using the same terminology and reference symbols.

—Structure of the Webbing Take-up Device—

As shown in FIG. 8, an inner rib 126 that structures the winding portion is formed at an inner edge of the flange portion 22 so as to protrude to the front side in the axial direction D. The inner rib 126 is formed in an annular shape. The inner rib 126 is structured with the inner side portion 25 and outer side portions 124.

Two of the outer side portions 124 are formed at the outer side of the inner side portion 25 so as to connect between the two accommodation holes 29. Heights of the outer side portions 124 in the axial direction D may be made substantially constant.

Figure 9A:
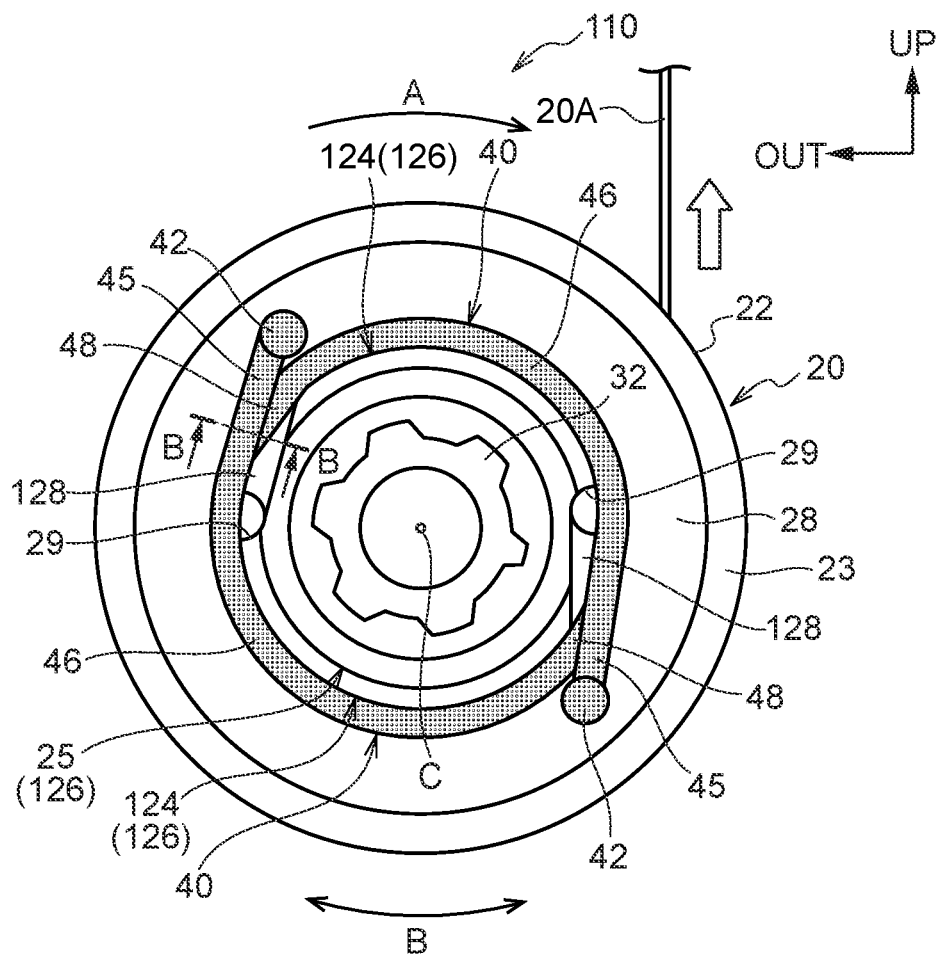
FIG. 9A is a view showing the spool according to the second exemplary embodiment, which is a side view seen from the one end side of the spool that shows a state in which the webbing is pulled out and the spool is rotated in the pull-out direction.
Figure 9B:
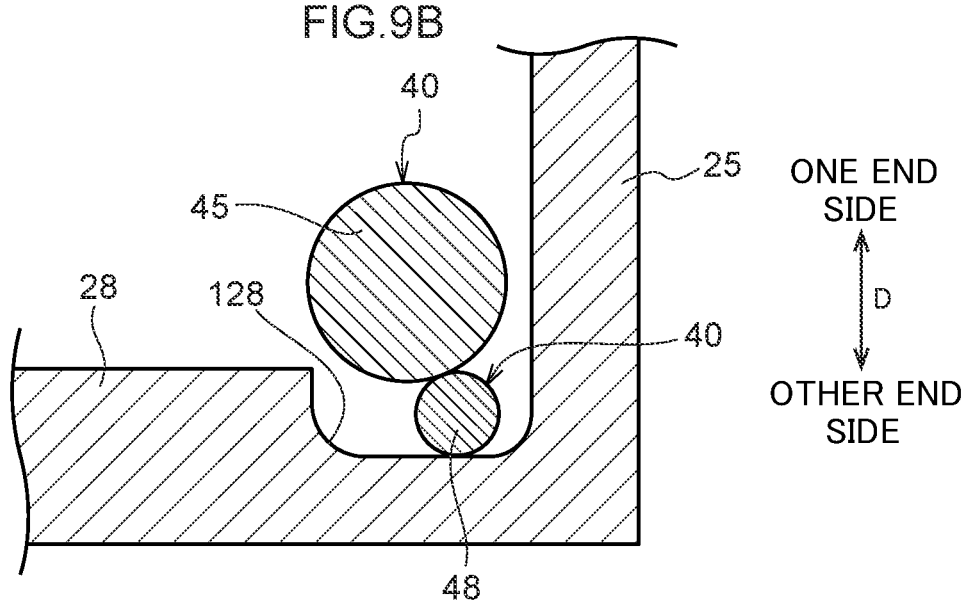
FIG. 9B is a sectional diagram showing section B-B in FIG. 9A.

As shown in FIG. 8 and FIG. 9B, retreat portions 128 are formed in recessed shapes that are recessed to the rear side in the axial direction D from the floor face of the trench portion 28. Each retreat portion 128 is provided so as to extend in the take-up direction A from the accommodation hole 29. The retreat portion 128 is provided at the radial direction outer side of the inner side portion 25. The retreat portion 128 is formed such that, when the wires 40 are wound on the inner rib 126 structured as the winding portion and the wires 40 are superposed in the radial direction, the retreat portion 128 extends from the accommodation hole 29 as far as the wire 40 at the outer side. That is, the retreat portions 128 are formed in recessed shapes at the periphery of the outer side portions 124.

The length of each retreat portion 128 in the take-up direction A may be substantially the same as the length of the distal end portion 48 of the wire 40. The depth of the retreat portion 128 in the axial direction is around the maximum diameter of the distal end portion 48. The retreat portion 128 is formed so as to connect up with the accommodation hole 29. The opening edge 29A is formed between the retreat portion 128 and the accommodation hole 29.

—Operation of the Force Limiter Mechanism—

In a webbing take-up device 110 according to the second exemplary embodiment, operation is similar to the webbing take-up device 10 according to the first exemplary embodiment until the distal end portion 48 of each wire 40 comes out from the accommodation hole 29 in the state in which the proximal end portion 42 of the wire 40 is retained at the pinion 52.

The distal end portion 48 of the wire 40 comes out from the accommodation hole 29, and the second intermediate portion 45 and third intermediate portion 46 of the wire 40 are wound onto the outer side portions 124 of the spool 20. At this time, as shown in FIG. 9A and FIG. 9B, the distal end portion 48 of the wire 40 is guided to the retreat portion 128 and is enclosed at the other end side in the axial direction D of the second intermediate portion 45 of the other wire 40.

Operation of the Second Exemplary Embodiment

In the webbing take-up device 110 according to the second exemplary embodiment, each retreat portion 128 is structured in the vicinity of the accommodation hole 29 of the spool 20 as a recessed shape in the axial direction D of the spool 20.

Because the retreat portion 128 is structured in the vicinity of the accommodation hole 29 of the spool 20 in the recessed shape in the axial direction D of the spool 20, when the wires 40 are winding onto the inner rib 126 and the distal end portion 48 of one wire 40 comes out from the accommodation hole 29, the second intermediate portion 45 of the other wire 40 acts to so as to restrain the distal end portion 48 of the one wire 40. That is, the distal end portion 48 of the one wire 40 may be enclosed under the other wire 40. Consequently, strong pressing by the distal end portion 48 of the wire 40 against the inner rib 126 is suppressed. As a result, abrasion of the inner rib 126 by the distal end portion 48 of the wire 40 is suppressed. Temporary rises in force limiter load due to the wires 40 may be suppressed by a simple structure.

Other structures and operational effects are substantially the same as in the first exemplary embodiment described above and accordingly are not described here.

While the webbing take-up device of the present disclosure has been described with respect to the above exemplary embodiments, specific structures are not limited by these exemplary embodiments. Design changes and modifications that do not depart from the scope of the disclosure according to the attached claims may be embodied. The retreat portion 24B according to the first exemplary embodiment and the retreat portion 128 according to the second exemplary embodiment may be combined.

The exemplary embodiments described above illustrate examples in which each distal end portion 48 is formed in a shape that tapers toward the distal end of the wire 40. However, the distal end portion is not limited to this mode and may be formed in a circular rod shape.

The exemplary embodiments described above illustrate examples in which each wire 40 is formed substantially in a crank shape. However, the wire is not limited to this mode and may be formed in, for example, a rod shape that extends straight.

The exemplary embodiments described above illustrate examples in which each accommodation hole 29 is formed in a region at the radial direction inner side of the trench portion 28. However, the accommodation hole may be formed in a region at the radial direction outer side of the trench portion 28, and may be formed in a radial direction middle region.

The exemplary embodiments described above illustrate examples in which the two wires 40 are formed with the same lengths and the same shapes. However, the two wires may have different lengths. Consequently, kinetic energy of a vehicle occupant may be absorbed in three stages—being absorbed by torsional deformation of the torsion shaft 32 and deformation of the two wires 40, subsequently being absorbed by torsional deformation of the torsion shaft 32 and deformation of one of the wires 40, and subsequently being absorbed by further torsional deformation of the torsion shaft 32—and the vehicle occupant may be protected. The two wires 40 may also be formed with different diameters.

The exemplary embodiments described above illustrate examples in which two of the wires 40 are provided at the spool 20. However, one or three or more of the wires 40 may be provided at the spool 20.

The invention claimed is:

1. A webbing take-up device comprising:
   a spool that enables pull-out and take-up of a webbing;
   a rotor disposed opposite from the spool, rotation of the rotor being impeded at a time of emergency;
   a wire of which a proximal end portion is retained at the rotor, the wire being disposed between the rotor and the spool, wherein, at a time of emergency, the wire is deformed and the webbing is pulled out, the wire being wound onto a winding portion of the spool; and
   a retreat portion toward which a distal end portion of the wire retreats in a case in which the wire is wound onto the winding portion, wherein:
   the winding portion is disposed at a flange of the spool, the flange is formed at one end side, in an axial direction, of the spool, and the winding portion is a rib that is formed along a circumference direction of the spool and that is protruded outwardly, in the axial direction, from the flange, and
   the retreat portion is formed in a sloped shape at one end portion, in the circumference direction, of the rib, and the one end portion is angled, in the axial direction, toward an outer surface of the flange such that a height, in the axial direction, of the retreat portion is tapered.

2. The webbing take-up device according to claim 1, wherein the retreat portion is formed in a recessed shape at a periphery of the winding portion.

3. The webbing take-up device according to claim 1, wherein the winding portion is recessed toward an inner side in a winding direction, at the winding portion at which the retreat portion is provided.

4. The webbing take-up device according to claim 1, wherein the retreat portion is formed at a periphery of an accommodation hole of the spool, the distal end portion of the wire being accommodated by the accommodation hole.

5. The webbing take-up device according to claim 1, wherein a plurality of wires are provided.

6. A webbing take-up device comprising:
   a spool that enables pull-out and take-up of a webbing;
   a rotor disposed opposite from the spool, rotation of the rotor being impeded at a time of emergency;
   a wire of which a proximal end portion is retained at the rotor, at least a distal end portion of the wire being retained at the spool, the wire being disposed between the rotor and the spool, wherein the webbing is pulled out at a time of emergency of a vehicle, the wire being deformed and being wound onto a winding portion of the spool; and
   a retreat portion provided at the winding portion, the distal end portion of the wire being disposed at the retreat portion in a case in which the wire is wound onto the winding portion, wherein:
   the winding portion is disposed at a flange of the spool, the flange is formed at one end side, in an axial direction, of the spool, and the winding portion is a rib that is formed along a circumference direction of the spool and that is protruded outwardly, in the axial direction, from the flange, and
   the retreat portion is formed in a sloped shape at one end portion, in the circumference direction, of the rib, and the one end portion is angled, in the axial direction, toward an outer surface of the flange such that a height, in the axial direction, of the retreat portion is tapered.

7. The webbing take-up device according to claim 6, wherein the retreat portion is formed in a recessed shape at a periphery of the winding portion.

8. The webbing take-up device according to claim 6, wherein the winding portion is recessed toward an inner side in a radial direction of the spool at a part of the winding portion at which the retreat portion is provided.

9. The webbing take-up device according to claim 6, wherein the retreat portion is formed at a periphery of an accommodation hole of the spool, the distal end portion of the wire being accommodated by the accommodation hole.

10. The webbing take-up device according to claim 6, wherein a plurality of wires are provided.

11. The webbing take-up device according to claim 1, wherein:
    an accommodation hole is formed at the spool, a distal end portion of the wire is accommodated by the accommodation hole, and
    the sloped shape of the retreat portion connects up with the accommodation hole.

12. The webbing take-up device according to claim 1, wherein a width of the retreat portion in a radial direction of the spool is progressively decreased toward a distal end of the rib.

13. The webbing take-up device according to claim 1, wherein the retreat portion is recessed inwardly, in the axial direction, from the outer surface of the flange toward an inside, in the axial direction, of the flange.

14. The webbing take-up device according to claim 6, wherein:
    an accommodation hole is formed at the spool, a distal end portion of the wire is accommodated by the accommodation hole, and
    the sloped shape of the retreat portion connects up with the accommodation hole.

15. The webbing take-up device according to claim 6, wherein a width of the retreat portion in a radial direction of the spool is progressively decreased toward a distal end of the rib.

16. The webbing take-up device according to claim 6, wherein the retreat portion is recessed inwardly, in the axial direction, from the outer surface of the flange toward an inside, in the axial direction, of the flange.

* * * * *